Patented Mar. 12, 1940

2,193,556

UNITED STATES PATENT OFFICE 2,193,556

DYESTUFF INTERMEDIATE

Arthur Ernest Everest and James Arthur Wallwork, Huddersfield, England, assignors to John W. Leitch & Company Limited, Huddersfield, England, a British company No Drawing. Application June 9, 1937, Serial No. 147,260. In Great Britain June 16, 1936

2 Claims. (Cl. 8—46)

This invention relates to the production of preparations containing arylamides of β-hydroxynaphthoic acid or aceto-acetic arylides.

In the art of applying the insoluble azoic colours to textile fibres, use is made of the arylamides of β-hydroxynaphthoic acid and acetoacetic arylides. The aforesaid arylamides or arylides are insoluble in water and it is first necessary to treat them with an alkaline solution such as a caustic soda solution and usually with the further addition of a salt of a sulphonated fatty acid such as Turkey red oil in order to render the product water soluble.

It is an object of this invention to provide a water soluble powder containing an arylamide of β-hydroxynaphthoic acid or an aceto-acetic arylide which has the advantage that the user is saved much trouble in preparing a solution of the arylamide or arylide.

According to the present invention a water soluble powder is provided comprising one or more arylamides of β-hydroxynaphthoic acid or one or more aceto-acetic arylides, one or more powdered or finely crystalline alkaline-reacting salts stable on storage and sufficiently alkaline to dissolve the aforesaid arylamide or arylamides or the aforesaid arylide or arylides and one or more wetting or dispersing agents capable of being prepared in powder form.

Suitable arylamides of β-hydroxynaphthoic acid are the products known under the trade names Brenthol A. S. (β-hydroxy naphthoic acid anilide), Brenthol O. T. (o-toluidide of β-hydroxy naphthoic acid), Brenthol M. N. (β-hydroxy naphthoic acid-m-nitroanilide), Brenthol C. T. (5.chloro-o-toluidide of β-hydroxy naphthoic acid) and Brenthol A. N. (β-hydroxy-naphthoic acid-α-naphthalide) (the word Brenthol being a registered trade mark).

Suitable aceto-acetic arylides are the products known under the trade names Naphthol A. S. G. or Brenthol A. T. (diaceto-acetic toluidide).

Brenthol O. T. is equivalent in composition to Naphthol A. S. D. whilst Brenthol A. T. is equivalent to Naphthol A. S. G. and Brenthol C. T. is equivalent to Naphthol A. S. T. R.

Suitable alkaline reacting salts are sodium metasilicate, soda ash, and tri-sodium phosphate. Aminated fatty substances such as the product known under the trade name Igepon T. powder, soaps, sulphonated fatty acids, fatty oils and fatty alcohols or alkali metal or ammonium salts thereof such as the products known under the trade names Lissapol A. T. powder (this is the same as Lissapol A. but of double strength), Gardinol C. A. powder and sulphonated Ocenol powder, (the words Igepon, Lissapol, Gardinol and Ocenol being registered trade-marks) and sulphonated oleyl and cetyl alcohols may be used as the wetting or dispersing agents. Lissapol A. T., Lissapol A., Gardinol C. A. and sulphonated Ocenol are all sulphated higher fatty alcohols, while Igepon T. is an animated higher fatty compound.

The following are examples illustrating preparations produced according to the invention:

1. 
| | Pounds |
|---|---|
| Brenthol A. S. powder | 10 |
| Sulphonated Ocenol powder | 5 |
| Powdered or finely crystalline sodium metasilicate | 35 |
| | 50 |

The ingredients are intimately mixed in a horizontal mixing drum or by any other suitable means until a uniform mixture is produced.

The resulting powder is stable and easily soluble in boiling water.

2. 
| | Pounds |
|---|---|
| Brenthol M. N. powder | 10 |
| Igepon T. powder | 5 |
| Soda ash powder | 10 |
| Powdered or finely crystalline sodium metasilicate | 30 |
| | 55 |

The mixing is effected as in Example 1.

3. 
| | Pounds |
|---|---|
| Brenthol O. T. powder | 10 |
| Gardinol C. A. powder | 6 |
| Powdered or finely crystalline tri-sodium phosphate | 44 |
| | 60 |

The mixing is effected as in Example 1.

4. 
| | Pounds |
|---|---|
| Brenthol A. T. (diaceto-acetic toluidide | 10 |
| Sulphonated Ocenol powder | 5 |
| Powdered or finely crystalline sodium metasilicate | 40 |
| | 55 |

The mixing is effected as in Example 1.

5. 
| | Pounds |
|---|---|
| Brenthol C. T. | 10 |
| Soap powder | 5 |
| Powdered or finely crystalline sodium metasilicate | 35 |
| | 50 |

The mixing is effected as in Example 1.

| | Pounds |
|---|---|
| 6. Brenthol C. T. | 10 |
| Igepon T. powder | 1 |
| Soap powder | 2 |
| Powdered or finely crystalline sodium metasilicate | 37 |
| | 50 |

The mixing is effected as in Example 1.

What we claim is:

1. As a new composition of matter, a dry, stable, non-hygroscopic powder free from caustic alkali, the constituents of which are in themselves stable and non-reactive with each other in the dry powder state, said composition comprising a dry powdered wetting agent, a normally water-insoluble dyestuff unreacted with alkali selected from the group consisting of arylamides of β-hydroxy naphthoic acids and aceto-acetic arylides, and an alkaline reacting salt capable of solubilizing said dyestuff when the composition is admixed with water, said constituents being so proportioned that upon addition of the composition to water, the water-insoluble dyestuff dissolves.

2. The composition set forth in claim 1 in which the alkaline reacting salt is trisodium phosphate.

ARTHUR ERNEST EVEREST.
JAMES ARTHUR WALLWORK.